UNITED STATES PATENT OFFICE.

MIKE SHADID, OF PEORIA, ILLINOIS.

MATCH-IGNITION COMPOSITION.

1,153,525.  Specification of Letters Patent.  Patented Sept. 14, 1915.

No Drawing.  Application filed June 13, 1914.  Serial No. 844,902.

*To all whom it may concern:*

Be it known that I, MIKE SHADID, a citizen of the United States, a resident of Peoria, in the county of Peoria and State of Illinois, have invented new and useful Improvements in Match-Ignition Composition, of which the following is a specification.

My invention relates to improvements in match ignition composition, that is, compositions for use in the manufacture of safety matches.

The principal object of my invention is the provision of a composition whereby a slow burning match is provided, which may be ignited in a heavy wind or rain and will burn without chance of accidental extinguishment.

In the manufacture of matches according to my invention, I make the stem of card or paste board, dipped in a solution of chlorate of potassium, preferably in the proportion of five parts of water to one part of chlorate of potassium. This provides a slow burning stem, which when ignited, cannot be readily extinguished.

For the head of the match, I use a composition composed of the following ingredients: gum arabic, bichromate of potassium, antimony sulfid, glass (powdered), coal dust, chlorate of potassium and sulfur. These ingredients are mixed with enough water to form a thick plastic mass or paste and the preferable proportion of the ingredients is about as follows: gum arabic 10 parts, bichromate of potassium 1.75 parts, antimony sulfid 1.50 parts, glass (powdered) 3 parts, coal dust 1.25 parts, chlorate of potassium 3 parts, and sulfur .50 parts.

I use a similar composition on the box containing these matches, for purposes of providing ignition surfaces, this composition including the ingredients in substantially the following proportions: antimony sulfid 1.50 parts, bichromate of potassium 1.50 parts, chlorate of potassium 3 parts, coal dust 1 part, glass (powdered) 3 parts, sulfur 1 part, gum arabic 3 parts.

This composition provides a very effective match, particularly under the conditions hereinbefore set forth.

What I claim is:—

A composition of matter including the following ingredients in substantially the following proportions: gum arabic 10 parts, bichromate of potassium 1.75 parts, antimony sulfid 1.50 parts, glass 3 parts, coal dust 1.25 parts, chlorate of potassium 3 parts, sulfur .50 parts.

MIKE SHADID.

Witnesses:
  J. M. ANDERSON,
  P. M. COPELAND.